(12) United States Patent
Fallais et al.

(10) Patent No.: US 8,063,170 B2
(45) Date of Patent: Nov. 22, 2011

(54) RADIATION CURABLE COMPOSITIONS

(75) Inventors: Isabelle Fallais, Tangissart (BE); Thierry Randoux, Braine l'Alleud (BE); Marc Decaux, Brussels (BE)

(73) Assignee: Cytec Surface Specialities, S.A., Bruxelles (BE)

( * ) Notice: Subject to any disclaimer, the term of this patent is extended or adjusted under 35 U.S.C. 154(b) by 752 days.

(21) Appl. No.: 12/087,741

(22) PCT Filed: Feb. 2, 2007

(86) PCT No.: PCT/EP2007/051048
§ 371 (c)(1),
(2), (4) Date: Aug. 27, 2008

(87) PCT Pub. No.: WO2007/099016
PCT Pub. Date: Sep. 7, 2007

(65) Prior Publication Data
US 2009/0004483 A1 Jan. 1, 2009

(30) Foreign Application Priority Data
Feb. 28, 2006 (EP) .................................. 06004045

(51) Int. Cl.
*C08G 63/02* (2006.01)
*C08G 63/16* (2006.01)
*C08G 63/91* (2006.01)
*C08F 2/42* (2006.01)

(52) U.S. Cl. ........ 528/272; 528/271; 528/300; 528/303; 528/306; 522/104; 522/107; 522/100; 522/101; 522/134; 522/135; 522/141; 522/143; 522/144; 522/153; 522/163; 522/165; 522/178; 522/179; 522/181; 427/508; 427/512

(58) Field of Classification Search ............... 528/271, 528/272, 300, 303, 306; 522/100, 103, 101, 522/104, 107, 134, 135, 141, 143, 144, 153, 522/163, 165, 178, 179, 181; 427/487, 496, 427/498, 508, 512
See application file for complete search history.

(56) References Cited

U.S. PATENT DOCUMENTS

| | | | | |
|---|---|---|---|---|
| 3,974,303 | A * | 8/1976 | Iwase et al. ................ | 427/485 |
| 4,820,745 | A * | 4/1989 | Muller et al. ................ | 522/90 |
| 4,822,829 | A * | 4/1989 | Muller et al. ................ | 522/90 |
| 4,983,712 | A * | 1/1991 | Meixner et al. .............. | 528/272 |
| 5,360,863 | A * | 11/1994 | Meixner et al. .............. | 525/28 |
| 5,639,560 | A * | 6/1997 | Moens et al. ................ | 428/482 |
| 5,741,602 | A * | 4/1998 | Hoppe et al. ................ | 428/482 |
| 5,763,099 | A * | 6/1998 | Misev et al. ................. | 428/482 |
| 6,011,080 | A * | 1/2000 | Daly et al. ................... | 522/107 |
| 6,380,279 | B1 * | 4/2002 | Moens et al. ................ | 522/111 |
| 6,380,297 | B1 | 4/2002 | Zion et al. | |
| 7,951,427 | B2 * | 5/2011 | Moens et al. ................ | 427/461 |
| 2002/0132059 | A1 * | 9/2002 | Maddox et al. ............. | 427/487 |
| 2008/0220178 | A1 * | 9/2008 | Moens et al. ................ | 427/458 |

FOREIGN PATENT DOCUMENTS

| | | |
|---|---|---|
| EP | 0 089 913 | 9/1983 |
| EP | 1 726 621 | 11/2006 |
| WO | 2005/108513 | 11/2005 |

* cited by examiner

*Primary Examiner* — Sanza McClendon
(74) *Attorney, Agent, or Firm* — Wenderoth, Lind & Ponack, LLP

(57) ABSTRACT

Radiation curable compositions comprising at least one radiation curable oligomer obtained from the reaction of one or more carboxyl functional polyester (a) having a glass transition temperature $T_G$ and/or melting temperature $T_m$ of less than 30° C., with (b1) one or more (meth)acrylated monoepoxide, and/or (b2) one or more polyepoxide and one or more α, β unsaturated carboxylic acid.

11 Claims, No Drawings

RADIATION CURABLE COMPOSITIONS

The invention relates to radiation curable compositions, especially usable for coil coating. Coil coaters coat metal coils of various types and forms. Coil coating is a continuous and highly automated process for coating metal at high speed before fabrication. The process usually consists of the following steps. The metal coil is unwound and both the top and bottom sides are mechanically and chemically cleaned to remove oil, grease and dirt. After cleaning, a chemical pre-treatment can be applied to the sheet in order to enhance the corrosion protection and the paint adhesion. The strip then moves directly into a drying oven before entering the coating unit. After the paint has been applied, the strip moves again into a drying oven before being cooled and rewound for shipment. The precoated sheets are used in the metal-processing industry. So, many metal articles are not coated or painted as used or when assembled, but are first coated as flat stock provided in coils and then formed, cut and assembled into the desired articles. As a consequence, a key criterion in almost all cases is the ability to post form or bend the coated strip. Post forming is usually done by high speed processing equipment wherein the metal bending can be very severe. The coating must be flexible to allow the post forming or bending to occur without cracking and yet maintain adhesion. The full system what means the metal, in some cases the protective zinc layer, the pretreatment layer and the paint layer has also to reach a high level of corrosion resistance. Basic properties like chemical and stain resistance remain important and for some applications, properties like humidity and sterilization tests resistance are also required.

Radiation curable systems could be a good fit for coil coating; the substrate is flat, the line speed is high, it can solve environmental issues like the use of solvents and it requires less energy and floor space than the curing ovens necessary with other coating technologies. However until now, radiation curable coating compositions, especially UV formulations have not been widely used for coil coating applications. Typical UV formulations consist of (meth)acrylated oligomers and reactive diluents, which when cured, form a highly crosslinked coating layer having good properties such as chemical resistance, scratch resistance and surface hardness. Such high crosslink density is also associated with a limited flexibility and shrinkage of the film limiting adhesion on the metal substrate. When trying to find solutions to these stringent requirements, one is often limited between lowering the molecular weight to achieve a reasonable viscosity and the need for a substantive molecular weight between crosslinks in order to reach the required cured coating flexibility.

For coil coating applications where a high level of flexibility is essential for post forming operations, typical UV formulations are not suitable. US 2002/0132059 A1 describes the principle of using a photopolymerizable coating composition for the coating of a coiled metal sheet. In the method for applying a coating to coiled metal sheet therein described, the metal sheet is first cleaned and then pretreated before applying the coating composition.

No specific photopolymerizable compositions are disclosed in this patent application. However not all photo-polymerizable coating compositions comprising unsaturated oligomers permit to obtain satisfying results when used in coil coating processes.

We have now found new radiation curable oligomers which are very suitable for being used in photo-polymerizable compositions.

Therefore the present invention relates to a radiation curable composition comprising at least one radiation curable oligomer having a glass transition temperature $T_G$ and/or melting temperature $T_m$ of less than 30° C. obtained from the reaction of one or more carboxyl functional polyester (a) having a glass transition temperature $T_G$ and/or melting temperature $T_m$ of less than 30° C., and obtained from, with respect to the total amount of acid constituent, 75 to 100 mol % of at least one straight-chain saturated di-carboxylic aliphatic acid having from 4 to 14 carbon atoms and optionally from 0 to 25 mol % of at least one other aliphatic, cycloaliphatic and/or aromatic polycarboxylic acid and, with respect to the total amount of alcohol constituent, from 25 to 100 mol % of at least one branched chain aliphatic diol and optionally from 0 to 75 mol % of at least one other aliphatic or cycloaliphatic polyol, with (b1) one or more (meth)acrylated mono-epoxide, and/or (b2) one or more polyepoxide and one or more $\alpha,\beta$ unsaturated carboxylic acid.

In the present invention, the term "(meth)acryl" is to be understood as to encompass both acryl and methacryl compounds or derivatives as well as mixtures thereof.

The radiation curable oligomer generally has a number average molecular weight of at least 600, preferably of at least 800 and more preferably of at least 1000. Generally the radiation curable oligomer has a number average molecular weight not exceeding 10000, preferably not exceeding 7000, most preferably not exceeding 5000.

The radiation curable oligomer preferably has a glass transition temperature $T_G$ and/or melting temperature $T_m$ of less than 20° C., as measured by Differential Scanning Calorimetry according to ASTM D3418 with a heating gradient of 20° C. per minute. The radiation curable oligomer more preferably has a glass transition temperature $T_G$ and/or melting temperature $T_m$ of less than 0° C.

The radiation curable oligomer used in the present invention is obtained from a carboxyl functional polyester. By carboxyl functional polyester is meant to designate a polyester comprising free, generally terminal, —COOH (carboxyl) groups. The carboxyl functional polyester generally has an acid number of 10 to 340 mg of KOH/g. The polyester used in the present invention preferably has an acid number of at least 20, more preferably of at least 25 and most preferably of at least 30. The polyester used in the present invention preferably has an acid number not exceeding 250 mg KOH/g, more preferably not exceeding 190 and most preferably not exceeding 80 mg KOH/g.

Carboxyl functional polyesters can also be obtained by the reaction of a hydroxyl functional polyester with a cyclic anhydride.

By hydroxyl functional polyester is meant to designate in the present invention a polyester having free, generally terminal, hydroxyl groups and generally having an hydroxyl number of 10 to 340 mg of KOH/g. The hydroxyl functional polyester used in the present invention preferably has an hydroxyl number of 25 to 250 mg of KOH/g, more preferably of 30 to 190 mg KOH/g. The carboxyl and/or hydroxyl functional polyesters used in the present invention are obtained from the reaction of an acid constituent comprising one or more polyacids with an alcohol constituent comprising one or more polyols. The polyester is obtained from, with respect to the total amount of acid constituent, 75 to 100 mol % of at least one straight-chain saturated aliphatic di-carboxylic acid having from 4 to 14 carbon atoms and optionally from 0 to 25 mol % of at least one other aliphatic, cycloaliphatic and/or aromatic polycarboxylic acid and, with respect to the total amount of alcohol constituent, from 25 to 100 mol % of at least one branched chain aliphatic diol and optionally from 0 to 75 mol % of at least one other aliphatic or cycloaliphatic polyol.

The straight chain saturated aliphatic di-carboxylic acid having from 4 to 14 carbon atoms comprised in the polyester used in the present invention is preferably selected from succinic acid, adipic acid, glutaric acid, pimelic acid, suberic acid, azelaic acid, sebacic acid, dodecanedioic acid, undecanedioic acid, tridecanedioic acid, tetradecanedioic acid and the anhydrides thereof, alone or as a mixture. The straight chain saturated aliphatic diacid is most preferably adipic acid.

The other polycarboxylic acid optionally comprised in the polyester is generally chosen from di-carboxylic acids and/or the anhydrides thereof, more specifically from fumaric acid, maleic acid, phthalic anhydride, isophthalic acid, terephthalic acid, 1,4-cyclohexanedicarboxylic acid, 1,3-cyclohexanedicarboxylic acid, 1,2-cyclohexanedicarboxylic acid, alone or as a mixture. The polyester can also be a branched polyester obtained by incorporating up to 15 mol %, relative to the total amount of acid constituent, of a polyacid having at least three carboxylic acid groups or anhydrides thereof, such as trimellitic acid, pyrromellitic acid and their anhydrides, or mixtures thereof.

The polyester more preferably is obtained from 85 to 100 mole %, most preferably from 95 to 100 mol %, of straight chain saturated aliphatic di-carboxylic acid having from 4 to 14 carbon atoms, with respect to the total amount of acid constituent.

In stead of using polycarboxylic acids or in addition thereto, the corresponding anhydrides, esters or mixtures thereof may be used for the preparation of the polyesters.

The branched chain aliphatic diol used in the polyester is preferably selected from propylene glycol, neopentyl glycol, 1-methyl-1,3-propanediol 2-methyl-1,3-propanediol, 2-butyl-2-ethyl-1,3-propanediol, hydroxypivalate of neopentyl glycol and mixtures thereof. The branched chain aliphatic diol is most preferably neopentyl glycol.

The other aliphatic or cycloaliphatic polyol optionally comprised in the polyester is generally selected from di-, tri- and/or tetrafunctional polyols. Diols are preferably selected from ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,14-tetradecanediol, 1,16-hexadecanediol, 1,4-cyclohexanediol, 1,4-cyclohexanedimethanol, hydrogenated Bisphenol A and mixtures thereof. Polyalkylene glycols such as di and tri ethylene and propylene glycols can also be used. The diol is more preferably an aliphatic diol, particularly an alkyl-diol comprising from 2 to 12 carbon atoms. The polyester can also be a branched polyester incorporating of up to 30 mol percentage relative to the total amount of alcohol constituent, of polyols having 3 or more alcohol groups, preferably trifunctional and tetrafunctional polyols such as trimethylolpropane, ditrimethylolpropane, trimethylolethane, pentaerythrytol and mixtures thereof.

The polyester used in the present invention more preferably is obtained from 45 to 100 mol % of branched chain aliphatic diol, from 0 to 55 mole % of another aliphatic diol and from 0 to 30 mole % of tri- and/or tetrafunctional polyol, with respect to the total amount of alcohol constituent.

The carboxyl functional polyester used in the present invention generally has a number averaged molecular weight $M_N$ of from 400 to 9800. The polyester preferably has a $M_N$ of at least 600, more preferably of at least 800 and most preferably of at least 1000. The polyester preferably has a $M_N$ not exceeding 6800, more preferably not exceeding 4800 and most preferably not exceeding 4500.

In the present invention the number average molecular weight $M_N$ can be obtained from formula $$M_N = \frac{\sum_j (M_{ac})_j + \sum_k (M_b)_k - M_{H2O}}{\sum_j (n_{ac})_j + \sum_k (n_b)_k - n_{H2O}}$$

wherein j and k indicate, respectively, the different polyacids and polyols used in the polyester synthesis, $M_{ac}$ represent the weight in grams of the polyacids, $M_b$ represent the weight in grams of the polyols used in the polyester synthesis, $n_{ac}$ and $n_b$ are the number of moles of, respectively, polyacids and polyols used in the polyester synthesis and $M_{H2O}$ and $n_{H2O}$ are, respectively, the weight in grams and the number of moles of water generated during the polyester synthesis.

In the particular case wherein a carboxyl functional polyester obtained from the reaction of a hydroxyl functional polyester with a cyclic anhydride is used, the molecular weight of the carboxyl functional polyester can be calculated from the number average molecular weight of the hydroxyl functional polyester and the molecular weight of the anhydride, taking into account the relative amounts of anhydride and hydroxyl functional polyester used, as well as his hydroxyl number.

The polyester used in the present invention is preferably an amorphous polyester. By amorphous polyester is meant to designate in the present invention a polyester which shows substantially no crystallization and which does not present a melting point as measured by Differential Scanning Calorimetry according to ASTM D3418 with a heating gradient of 20° C. per minute. The polyester more preferably has a glass transition temperature $T_G$ of from −120 to 25° C., as measured by Differential Scanning Calorimetry according to ASTM D3418 with a heating gradient of 20° C. per minute. The polyester preferably is a liquid at 25° C.

When carboxyl functional polyesters obtained from the reaction of a hydroxyl functional polyester with a cyclic anhydride are used, this cyclic anhydride preferably responds to the general formula (I):

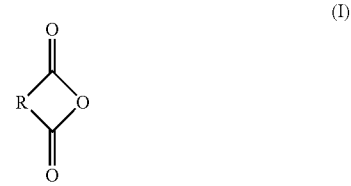

(I)

wherein R represents arylene, cycloalkylene, alkylene or alkenylene group, it being possible for R to bear alkyl, alkenyl groups, a —COOH group and/or another anhydride group. Exemplary anhydrides include phthalic anhydride, hexahydrophthalic anhydride, glutaric anhydride, succinic anhydride, dodecenylsuccinic anhydride, maleic anhydride, trimellitic anhydride, pyromellitic anhydride. Preferred anhydrides are those wherein R is an arylene (more preferably phenylene) or an alkylene (more preferably ethylene) substituted by an alkenyl chain comprising from 5 to 20 carbon atoms. Mixtures of anhydrides can also be used.

The amount of anhydride used for the preparation of a carboxyl functional polyester from a hydroxyl functional polyester is generally at least 0.8 p, preferably at least 0.9 p and more preferably at least 0.95 p mole of anhydride per p equivalents of —OH groups present in the polyester. The amount of anhydride used is usually at most 1.2 p mole, preferably at most 1.1 p and more preferably at most 1.0 p mole, with respect to the p —OH equivalents of the polyester. The preparation of the carboxyl functional polyester from a hydroxyl functional polyester and an anhydride can be done in situ, without isolating the carboxyl functional polyester before its further reaction with the epoxide.

According to a first variant of the invention, the radiation curable oligomer is the reaction product of a carboxyl functional polyester with one or more (meth)acrylated monoepoxides. In this case, it is preferred to use relative amounts of carboxyl functional polyester and (meth)acrylated monoepoxide so that the number of equivalents of epoxide provided from the one or more (meth)acrylated mono-epoxide, y, is equal or greater than the number of —COOH groups, x, provided by the carboxyl functional polyester. Preferably y=x. When y is greater than x, it is preferred to add to the reaction mixture of the carboxyl functional polyester also at least one $\alpha,\beta$-unsaturated carboxylic acid, preferably in an amount of at least (y-x), more preferably of (y-x). By (meth) acrylated mono-epoxides is meant to designate compounds comprising one epoxy group and one or more (meth)acrylate groups. Examples of (meth)acrylated mono-epoxides that can be used are glycidyl (meth)acrylate esters, such as glycidylacrylate, glycidylmethacrylate, 4-hydroxybutylacrylate glycidylether, bisphenol-A diglycidylether monoacrylate. The (meth)acrylated mono-epoxides are preferably chosen from glycidylacrylate and glycidylmethacrylate.

According to a second and preferred variant of the invention, the radiation curable oligomer is the reaction product of a carboxyl functional polyester with at least one polyepoxide and at least one $\alpha,\beta$-unsaturated carboxylic acid. In this case, it is preferred to use relative amounts of polyester, polyepoxide and unsaturated carboxylic acid such that for x equivalents of —COOH groups provided by the polyester, at least z equivalents of polyepoxide and at least (z-x) equivalents of $\alpha,\beta$-unsaturated carboxylic acid are present. In this variant of the invention, z is preferably at least 1.5x, more preferably at least 2x. z does usually not exceed 20x, preferably not 15x. When z is greater than 2x, the excess of polyepoxide reacts with the $\alpha,\beta$-unsaturated carboxylic acid so that an unsaturated polyepoxide derivative is formed in situ.

By polyepoxide is meant to designate any compound comprising at least two epoxide functions. The polyepoxides are generally chosen from glycidyl ethers of aromatic or aliphatic polyols, from glycidyl esters of aromatic or aliphatic polyacids or from cycloaliphatic polyepoxides. Preferred are diglycidylethers of aromatic or aliphatic diols or diglycidylesters of aromatic or aliphatic diacids or cycloaliphatic diepoxides, such as diglycidylether of bisphenol-A, diglycidylether of bisphenol-F, diglycidylether of poly(ethylene oxide-co-propylene oxide) (commercialized under the name of DER 736), diglycidylether of polypropylene oxide (commercialized under the name of DER 732), diglycidylether of hexanediol (commercialized under the name of NPEK-051), diglycidylether of butanediol (commercialized under the name of Araldite DY 026 SP), diglycidylester of linoleic acid dimer (commercialized under the name of Erisys GS-120), celloxide 2081. Particularly preferred are diglycidyl ether of bisphenol-A, diglycidylether of poly(ethylene oxide-co-propylene oxide), diglycidylether of polypropylene oxide, diglycidylether of butanediol.

The $\alpha,\beta$-unsaturated carboxylic acid is preferably chosen from acrylic and methacrylic acid, most preferably acrylic acid. The amount of $\alpha,\beta$-unsaturated carboxylic acid used in the second variant of the invention is preferably (z-x) equivalents wherein z is the amount of polyepoxide equivalents and x is the amount of —COOH equivalents of the carboxyl functionalized polyester. In this second variant of the invention, it is preferred to prepare the radiation curable oligomer by adding the $\alpha,\beta$-unsaturated carboxylic acid to the carboxyl functionalized polyester before or at the latest at the same time as the polyepoxide.

According to a third variant of the invention, the radiation curable oligomer is obtained from the reaction the of one or more carboxyl functional polyester (a) with one or more (meth)acrylated mono-epoxide and with one or more polyepoxide and one or more $\alpha,\beta$-unsaturated carboxylic acid.

The reaction of the carboxylated polyester with the epoxide is generally conducted in the presence of one or more catalysts. One or more polymerization inhibitors may be added during or after the reaction.

The radiation curable oligomers according to the invention can be prepared as such, but can also be prepared in the presence of a non reactive diluent. By non reactive diluent is meant to designate a compound that does not react with the carboxyl functional polyester, the epoxide and/or the unsaturated carboxylic acid during their reaction. According to a preferred embodiment, at least one radiation curable non-reactive diluent is added to the radiation curable oligomers, during, at the end of and/or after their synthesis.

The radiation curable composition according to the invention generally contains at least 5%, preferably at least 10%, more preferably at least 15% and most preferably at least 25%, by weight of radiation curable oligomer. The amount of radiation curable oligomer usually does not exceed 95% by weight, preferably 80% by weight of the curable composition.

The radiation curable composition according to the invention preferably contains, besides the one or more radiation curable oligomers, at least one radiation curable diluent. This diluent is preferably a copolymerizable ethylenically unsaturated monomer, more preferably a mono- or polyfunctional (meth)acrylate monomer. By copolymerizable ethylenically unsaturated monomer is meant to designate monomers that are copolymerisable with the radiation curable oligomer, generally under photo-polymerization conditions, especially by irradiation. Preferred copolymerizable ethylenically unsaturated monomers are mono and polyfunctional (meth)acrylamides and (meth)acrylates comprising at least one and preferably not more than 6 (meth)acrylate groups. Examples of suitable monomers include octyl-decyl acrylate, lauryl acrylate, phenoxyethyl acrylate, isobornyl acrylate, phenylglycidyl ether acrylate, cyclic trimethylolpropane formal acrylate, n-butyl acryloyloxy ethyl carbamate, tetrahydrofurfuryl acrylate, acryloyl morpholine, butanediol monoacrylate, dihydrodicyclopentadienyl acrylate, the reaction products of acrylic acid with the glycidyl ester of aliphatic carboxylic acids such as neodecanoic acid and their mixtures. Most preferred diluents are phenoxyethyl acrylate, isobornyl acrylate, n-butyl acryloyloxy ethyl carbamate, tetrahydrofurfuryl acrylate, acryloyl morpholine, the reaction products of acrylic acid with the glycidyl ester of aliphatic carboxylic acids such as neodecanoic acid and their mixtures. The amount of radiation curable diluent present in the radiation curable composition is generally from 0 to 95%, more preferably from 5 to 75%, more preferably from 10 to 40%, by weight.

The radiation curable composition preferably presents a viscosity of 100 to 8000 mPa·s at 25° C., preferably from 1500 to 3500 mPa·s, as measured according to ISO 12058.

The radiation curable composition used in the process according to the invention usually also contains at least one inhibitor. Inhibitors include without limitation hydroquinone, toluhydroquinone, monomethyl ether hydroquinone, tert-butyl hydroquinone, di-tert-butyl hydroquinone, 2,6-di-tert-butyl-4-methylphenol (BHT), phenothiazine. The amount of inhibitor used is preferably from 0 to 0.5% by weight.

The radiation curable composition may also comprise at least one photochemical initiator and/or chemical initiator, capable of initiating the polymerization of the radiation curable oligomer and optionally the other radiation curable compounds present therein. Photochemical initiators (also called photoinitiators) are compounds that can generate radicals by absorption of light, typically UV light. The photoinitiators are preferably free-radical photoinitiators.

When cured under UV-light, curable compositions comprising at least one photoinitiator are preferred. The amount of photoinitiator or chemical initiator in the composition is preferably comprised between 0.01 and 5 wt %.

Alternatively, the composition can be cured in the absence of an initiator, especially by electron beam radiation.

The radiation curable composition may also contain one or more adhesion promotors. The amount of adhesion promoters is generally from 0 to 20% by weight. Preferably an amount of 2 to 15% by weight of adhesion promotor is used.

The radiation curable composition according to the invention may also comprise pigments, colorants and/or other additives such as multifunctional (meth)acrylated compounds, conductive pigments, dispersing agents, flow modification agents, slip agents, fire retardant agents, UV-protection agents. The amount of additives preferably does not exceed 10% by weight. The radiation curable compositions according to the invention are preferably substantially free of water and organic solvents which are considered as being volatile organic solvents (VOC's). Hence, the compositions are generally considered as 100% solids (after curing) radiation curable composition, which do not need evaporation of water or solvent during subsequent curing.

The radiation curable compositions according to the invention permits to obtain coatings having a good chemical and solvent resistance, scratch resistance and surface hardness together with an improved flexibility, adhesion and resistance to cracking on bending and rapid deformation and improved corrosion resistance. The coatings have an improved balance of flexibility and surface properties. The radiation curable compositions have also an improved heat resistance and show good electrical insulation properties. These properties make them suitable for being used in a large number of applications such as coating applications on substrates such as metal, plastics and glass. The compositions according to the invention are suitable for a large number of applications, such as metal coating, coil coating and decoration, especially as coating for agricultural and construction equipment, domestic appliances, pipe coating, building coating, wire coating such as copper wire coating, automotive applications, especially as primer in automotive refinish, and can coating. The radiation curable composition can also be used in thermoforming applications, such as in-mold decoration. The composition is also suitable to be used for making electrical sleeves and glass laminates. The compositions are especially useful for coating flexible substrates such as packaging materials and plastics. The radiation curable composition is also useful for the formulation of UV-curable screen inks presenting high flexibility and impact resistance.

The present invention therefore also relates to the use of a composition as described here above for coating applications and especially to a process for preparing a coated article comprising a step wherein the article is coated with a composition as described here above.

The radiation curable compositions have been found particularly suitable for metal and coil coating applications. The present invention therefore also relates to their use for metal coating, especially coil coating applications and more specifically to a process for preparing a coated metal sheet coil comprising the following steps:
(1) decoiling of the coiled metal sheet;
(2) coating the metal sheet with a curable composition comprising at least one radiation curable oligomer as described here above;
(3) curing the composition; and
(4) recoiling the coated metal sheet.

The metal sheet is generally chosen from cold rolled steel (with or without pre-treatment), hot rolled steel (with or without pre-treatment), stainless steel, Zn-treated steel (with or without pre-treatment), such as electro-zinced and hot dip galvanized steel, Al (with or without pre-treatment) and hot dip tin.

In the process according to the invention, the decoiling and recoiling of the metal sheet can be done by any means suitable therefore. In the process according to the invention the decoiled metal sheet can be submitted to any suitable treatment before coating it with the curable composition. The decoiled metal sheet is usually cleaned in order to remove the protection oil layer. After cleaning, a chemical pretreatment can also applied to the sheet in order to enhance the corrosion protection and the coating adhesion.

In the process according to the invention, the radiation curable composition can be applied to the article to be coated, especially to the metal sheet, by any means suitable therefore such as dip coating, spray coating, electrostatic coating, film coating, curtain coating, vacuum application, roll coating or the like. It is preferably applied by roll coating. The application of the curable composition to the article, especially to the metal sheet can be done at any suitable temperature, such as room temperature or at a higher temperature, for example by heating the metal sheet, the roller coater and/or the curable composition.

After the coating of the article or the metal sheet with the curable composition, the latter is cured. Curing, i.e. polymerization can be achieved by any suitable means well known to those skilled in the art, such as thermal curing or irradiation. The irradiation curing can be done by using UV light or ionizing radiation such as gamma rays, X-rays or electron beam. In the process according to the invention, electron beam and especially UV-radiation are preferred. After the curing of the curable composition, the coated metal sheet can be re-coiled immediately or one or more additional coatings can be applied thereto before re-coiling or the recoiled coated metal sheet can be moved to another coating line where one or more additional coatings can be applied thereto. In the process according to the invention, steps (2) and (3) can be repeated in order to coat the metal sheet with two or more curable compositions as defined here above. In this case, the curable compositions can be the same or different.

The process according to the invention permits to obtain coated articles, especially metal coils with a reduced amount or even without the use of solvents, hence a reduced fire hazard and reduction of energy use, need for elimination or recycling of solvents and space saving on the line (no drying ovens necessary).

The process according to the invention permits to obtain coated articles, especially metal sheets having an improved chemical and solvent resistance, scratch resistance and surface hardness together with an improved flexibility, adhesion and resistance to cracking on bending and rapid deformation and improved corrosion resistance which make them suitable for being used for postforming. The coatings have an improved balance of flexibility and surface properties.

The process according to the invention when used to apply a curable primer on the galvanization or electrozinc line after deposition of the zinc layer onto the metal surface could permit to avoid some or all of the following steps of the current process: oiling of the strip before recoiling on the galvanization or electrozinc line, chemical cleaning, chemical pretreatment and application of a classical primer on the coating line. Chemical pretreatment is often a chromatation using Cr VI, the use of the process according to the invention would permit to solve this environmental issue. The process according to the invention permits to obtain coated metal coils having a good corrosion resistance even without the use of chemical pretreatments of the metal, for example by chromatation.

The present invention further relates to the use of the radiation curable composition for making electrical sleeve coatings and to a process for preparing an electrical sleeve coating wherein a sleeve, preferably made of glass fiber, is coated and/or impregnated with a radiation curable composition as described here above. After coating and/or impregnation the radiation curable composition is cured such as described here above. This sleeve may be used to surround an electrical wire or bundle of wires so that an insulated and heat-resistant electrical cable is obtained.

The examples which will follow illustrate the invention without limiting it. Except when otherwise indicated, the parts mentioned in the examples are parts by weight.

PREPARATION EXAMPLE 1

Hydroxyl Functional Polyester PE1

In a reactor of 2 liters connected with a heating jacket and equipped with a stirrer, were added 513 g of neopentylglycol and 646 g of adipic acid. The reaction mixture was stirred and heated progressively to 215° C. under nitrogen flow, the water being removed by distillation. When the acid value reached about 50 mg KOH/g, 0.20 g of FASCAT 4102 (tin catalyst) was added at atmospheric pressure and the reaction mixture was further heated at 215° C., the water being removed under vacuum until the acid value was lower than 1 mg KOH/g. The polyester is a transparent liquid with a hydroxyl number of 56 mg KOH/g; its average molecular weight was about 2000.

PREPARATION EXAMPLE 2

Hydroxyl Polyester PE 2

A polyester was prepared according to the method described in Preparation Example 1, except that 223 g of 1,4-butanediol, 272 g of neopentylglycol and 670 g of adipic acid were used. The polyester was a transparent liquid with a hydroxyl value of 56 mg KOH/g; its average molecular weight was about 2000.

PREPARATION EXAMPLE 3

Carboxyl Polyester PE 3

In a reactor of 7 liters connected with a heating jacket and equipped with a stirrer, were added 2023 g of neopentylglycol (NPG) and 3518 g of adipic acid. The reaction mixture was stirred and heated progressively to 215° C. under nitrogen flow, the water being removed by distillation. When the acid value reached about 50 mg KOH/g, 1.25 g of FASCAT 4102 was added at atmospheric pressure and the reaction mixture was further heated at 215° C., the water being removed under vacuum until the hydroxyl value was lower than 1 mg KOH/g. The polyester was a transparent liquid with a acid value of 56 mg KOH/g; its average molecular weight $M_N$ was about 2000.

EXAMPLE 1

Preparation of the Radiation Curable Oligomer 2504 g of the polyester PE1, 371 g of phthalic anhydride and 10 g of chromium octoate catalyst (AMC-2) were placed into a reaction flask equipped with an agitator, liquid addition funnel and a thermometer. The mixture was heated at 115° C. and maintained at this temperature for 2 hours. A mixture of 180 g acrylic acid, 2.88 g of hydroquinone HQ and 5.96 g of AMC-2 was added and the reaction mixture was stirred and maintained at 103° C. for one hour.

Then 926 g of diglycidyl ether of bisphenol-A (BADGE) was added dropwise to the reaction mixture so that the temperature did not exceed 120° C. and the reaction mixture was further stirred at 110° C. until the acid value was lower than 2.5 mgKOH/g and the epoxy value was lower than 0.1%.

A product with a viscosity (cone and plate viscosity, ISO 3219 at 60° C.) of 90300 mPas was obtained.

EXAMPLE 2

Example 1 was repeated, except that 1749 g of isobornyl acrylate (IBOA) were added to the reaction mixture together with the acrylic acid. A product with a viscosity (cone and plate viscosity, ISO 3219 at 25° C.) of 55700 mPas was obtained.

Alternatively, the IBOA was added to the reaction mixture at the end of the reaction, after cooling to 80° C. A product with a viscosity (cone and plate viscosity, ISO 3219 at 25° C.) of 53200 mPas was obtained.

EXAMPLE 3

An oligomer was synthesized according to the procedure described in Example 2, using following amounts: 626 g of polyester PE 2, 93 g of phthalic anhydride, 45 g of acrylic acid, 232 g of BADGE, 3.99 g of AMC-2, 0.72 g of HQ and 271 g of IBOA. A product with a viscosity (cone and plate viscosity, ISO 3219 at 60° C.) of 7800 mPas was obtained.

EXAMPLE 4

470 g of polyester PE 3 and 0.48 g of MeHQ were placed into a reaction flash equipped with an agitator, liquid addition funnel and a thermometer. The reaction mixture was heated to 103° C. and a mixture of 34 g of acrylic acid, 1.45 g of AMC-2 and 290 g of IBOA was added to the reactor. The temperature was maintained at 103° C. for one hour. Then 174 g of BADGE were added dropwise to the reaction mixture so that the temperature did not exceed 120° C. and the reaction mixture was further stirred at 110° C. until the acid value was lower than 2.5 mg KOH/g and the epoxy value was lower than 0.1%. A product with a viscosity (cone and plate viscosity, ISO 3219 at 25° C.) of 37300 mPas was obtained.

EXAMPLE 5

An oligomer was synthesized according to the procedure described in Example 3, using 626 g of polyester PE1 in stead of polyester PE 2. A product with a viscosity (cone and plate viscosity, ISO 3219 at 60° C.) of 32000 mPas was obtained.

EXAMPLE 6

An oligomer was synthesized according to the procedure described in Example 2, using following amounts: 260 g of polyester PE 1, 38 g of phthalic anhydride, 129 g of acrylic acid, 386 g of BADGE, 2.26 g of AMC-2, 0.65 g of BHT and 350 g of IBOA. A product with a viscosity (cone and plate viscosity, ISO 3219 at 60° C.) of 700 mPas was obtained.

EXAMPLE 7

An oligomer was synthesized according to the procedure described in example 4 using 290 g of phenoxyethylacrylate instead of IBOA. A product with a viscosity (cone and plate viscosity, ISO 3219 at 25° C.) of 21000 mPas was obtained.

COMPARATIVE EXAMPLE 8R

An acrylated polyester was prepared as follows: In a double jacket reactor of 1 L connected to an oil bath equipped with a stirrer, were added 400 g of polyester PE 1, 31.7 g of acrylic acid; 14.2 g of p-toluenesulfonic acid (PTSA), 288 g of toluene, 0.73 g of $Cu_2O$, 0.55 g methylhydroquinone (MeHQ) and 0.73 g of TNPP. The reaction mixture was heated up to reflux (115-120° C.) under oxygen flow. Water was removed by azeotropic distillation. When no more water was distilled, 0.6 g of MeHQ and 0.36 g of TNPP 0.36 g were added and toluene was distilled under reduced pressure. The polyesteracrylate had a viscosity at 60° C. of 1544 mPa·s (Höppler, ISO 12058 at 60° C.).

COMPARATIVE Example 9R

An acrylated polyester was prepared as in Comparative example 7R except that 400 g of polyester PE 2 was used. The polyesteracrylate had a viscosity at 60° C. of 898 mPa·s (Höppler, ISO 12058 at 60° C.).

EXAMPLES 10 TO 19 AND COMPARATIVE EXAMPLES 20R to 23R

UV curable formulations were prepared by mixing:
90 parts of the product obtained in, respectively, examples 2 to 5, 7, comparative examples 8R and 9R or commercial resins EBECRYL®629 and EBECRYL®3213
5 parts adhesion promoter (EBECRYL®171)
3 parts photoinitiator (ADDITOL®CPK)
2 parts photoinitiator (TPO-L)

The UV formulations were applied by means of a 10 μm bar coater on hot dip galvanized steel (examples 10 to 14 and comparative examples 22R and 23R) or chromated electrozinc steel (examples 15 to 19 and comparative examples 20R to 21R) and exposed to UV radiations from a 120 W/cm non focalized medium pressure mercury vapor lamp to obtain tack free films. The samples were tested for solvent resistance (ECCA T11), cross-hatch adhesion (ISO 2409), adhesion and resistance to cracking on bending (T-bend test EN 13523-7), adhesion and resistance to cracking on rapid deformation (reverse impact, ISO/DIS 6272-ASTM D 2794) and adhesion on slow drawn deformation (ISO 1520).

EXAMPLES 24 AND 25

UV curable formulations were prepared by mixing:
45 parts of the product obtained in example 1
45 parts of phenoxy ethylacrylate (EBECRYL® 114)
5 parts adhesion promoter (EBECRYL®171)
3 parts photoinitiator (ADDITOL®CPK)
2 parts photoinitiator (TPO-L)

The UV formulations were applied by means of a 10 μm bar coater on hot dip galvanized steel (example 24) or chromated electrozinc steel (example 25), cured and evaluated such as in example 10.

EXAMPLES 26 AND 27

UV curable formulations were prepared by mixing:
43.2 parts of the product obtained in example 1
46.8 parts of isobornyl acrylate
5 parts adhesion promoter (EBECRYL®171)
3 parts photoinitiator (ADDITOL®CPK)
2 parts photoinitiator (TPO-L)

The UV formulations were applied by means of a 10 μm bar coater on hot dip galvanized steel (example 26) or chromated electrozinc steel (example 27), cured and evaluated such as in example 10.

The results obtained are presented in the Table below.

| Ex. | Oligomer of Ex. | Solvent resist. (MEK DR) | Cross hatch adhesion | Adhesion ISO 1520 (mm) | T-bend adhesion | T-bend Cracking | Reverse impact adhesion | Reverse impact cracking |
|---|---|---|---|---|---|---|---|---|
| 10 | Ex. 2 | >100 | 0 | >8 | 0 T | 0 T | >18 J | >18 J |
| 11 | Ex. 3 | >100 | 0 | >8 | 0 T | 0 T | >18 J | >18 J |
| 12 | Ex. 4 | >100 | 0 | >8 | 0 T | 0 T | >18 J | >18 J |
| 13 | Ex. 5 | 30 | 0 | 6 | 1 T | 0 T | >18 J | >18 J |
| 14 | Ex. 7 | >100 | 0 | >8 | 0 T | 0 T | >18 J | >18 J |
| 15 | Ex. 2 | >100 | 0 | >8 | 0.5 T | 0 T | >18 J | >18 J |
| 16 | Ex. 3 | >100 | 0 | >8 | 1 T | 0 T | >18 J | >18 J |
| 17 | Ex. 4 | >100 | 0 | >8 | 1 T | 0 T | >18 J | >18 J |
| 18 | Ex. 5 | 30 | 0 | >8 | 0.5 T | 0 T | >18 J | >18 J |
| 19 | Ex. 7 | >100 | 0 | >8 | 0.5 T | 0 T | >18 J | >18 J |
| 20R | Ex. 8R | 5 | 0 | 6 | >1 T | >1 T | 1.96 J | >18 J |
| 21R | Ex. 9R | 20 | 0 | 6 | >1 T | >1 T | 1.96 J | >18 J |
| 22R | EB ® 626 | 80 | 1 | 0 | >1 T | | <1.96 J | |
| 23R | EB ® 3213 | 100 | 0 | 4 | >1 T | | 1.96 J | |
| 24 | Ex. 1 | >100 | 0 | >8 | 0 T | 0 T | >18 J | >18 J |
| 25 | Ex. 1 | >100 | 0 | >8 | 0 T | 0 T | >18 J | >18 J |

-continued

| Ex. | Oligomer of Ex. | Solvent resist. (MEK DR) | Cross hatch adhesion | Adhesion ISO 1520 (mm) | T-bend | | Reverse impact | |
|---|---|---|---|---|---|---|---|---|
| | | | | | adhesion | Cracking | adhesion | cracking |
| 26 | Ex. 1 | >100 | 0 | >8 | 0 T | 0 T | >18 J | >18 J |
| 27 | Ex. 1 | >100 | 0 | >8 | 0.5 T | 0 T | >18 J | >18 J |

As can be seen from the comparison of the results obtained here above, the oligomers according to the present invention permit to obtain coatings which have at the same time improved chemical and solvent resistance, together with an improved flexibility, adhesion and resistance to cracking on bending and rapid deformation.

EXAMPLE 28

A UV curable formulation was prepared by mixing 100 parts of the product obtained in Example 7 and 5 parts of photoinitiator.

EXAMPLE 29

A UV curable formulation was prepared by mixing 80 parts of the product obtained in Example 7, 20 parts by weight of acryloyl morpholine and 5 parts of photoinitiator.

Free-standing films were prepared with the formulations of Examples 28 and 29 and their mechanical and thermal resistance properties were tested and compared to films obtained from a commercial flexible epoxy acrylate (EBECRYL®3708). The results in table show that the compositions according to the present invention show better mechanical and thermal properties, making them particularly suitable for being used as coatings for electrical sleeves.

| Example | Elongation | Strength mPa · s | Young mod. mPa · s | Loss of weight at 190° C. after | |
|---|---|---|---|---|---|
| | | | | 30 days | 60 days |
| 28 | 128% | 2.1 | 3.9 | 29% | 49% |
| 29 | 183% | 11.9 | 43.9 | | 57% |
| EBECRYL ®3708 | 73% | 8.7 | 14.6 | 58% | 66% |

The invention claimed is:

1. Radiation curable composition comprising at least one radiation curable oligomer having a glass transition temperature $T_G$ and/or melting temperature $T_m$ of less than 30° C. obtained from the reaction of one or more carboxyl functional polyester (a) having a glass transition temperature $T_G$ and/or melting temperature $T_m$ of less than 30° C., and obtained from, with respect to the total amount of acid constituent, 75 to 100 mol % of at least one straight-chain saturated dicarboxylic aliphatic acid having from 4 to 14 carbon atoms and optionally from 0 to 25 mol % of at least one other aliphatic, cycloaliphatic and/or aromatic polycarboxylic acid and, with respect to the total amount of alcohol constituent, from 25 to 100 mol % of at least one branched chain aliphatic diol and optionally from 0 to 75 mol % of at least one other aliphatic or cycloaliphatic polyol, with (b1) one or more (meth)acrylated mono-epoxide, and/or (b2) one or more polyepoxide and one or more α, β unsaturated carboxylic acid.

2. Radiation curable composition according to claim 1 wherein the carboxyl functional polyester has an acid number of 10 to 340 mg of KOH/g.

3. Radiation curable composition according to claim 1 wherein the carboxyl functional polyester has a number average molecular weight of 400 to 9800.

4. Radiation curable composition according to claim 1, wherein the radiation curable oligomer is obtained from one or more carboxyl functional polyester (a) and one or more polyepoxide and acrylic and/or methacrylic acid.

5. Radiation curable composition according to claim 4, wherein the polyepoxide is selected from the diglycidylethers of aromatic or aliphatic diols, diglycidylesters of aromatic or aliphatic diacids and cycloaliphatic diepoxides.

6. Radiation curable composition according to claim 1, comprising at least 15% by weight of radiation curable oligomer.

7. Radiation curable composition according to claim 1, comprising from 5 to 75% by weight of at least one radiation curable diluent.

8. Radiation curable composition according to claim 7, wherein the radiation curable diluent is a monofunctional (meth)acrylate.

9. Process for preparing a coated article comprising a step wherein the article is coated with a radiation curable composition according to claim 1.

10. Process according to claim 9 comprising the following steps:
   (1) decoiling of a coiled metal sheet;
   (2) coating the metal sheet with the curable composition;
   (3) curing the composition; and
   (4) recoiling the coated metal sheet.

11. Process according to claim 9 wherein the article is a glass fiber sleeve.

* * * * *